Patented June 19, 1945

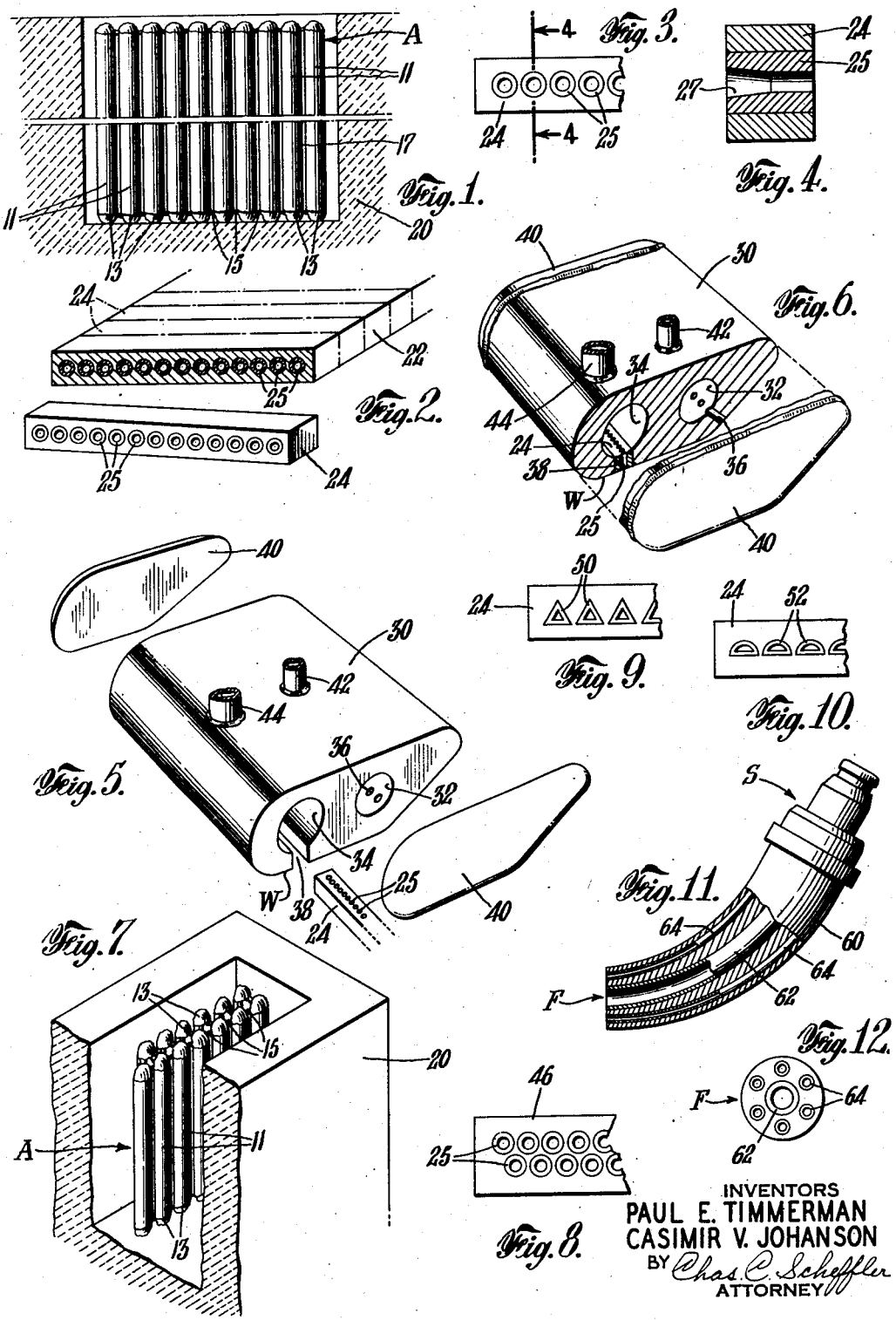

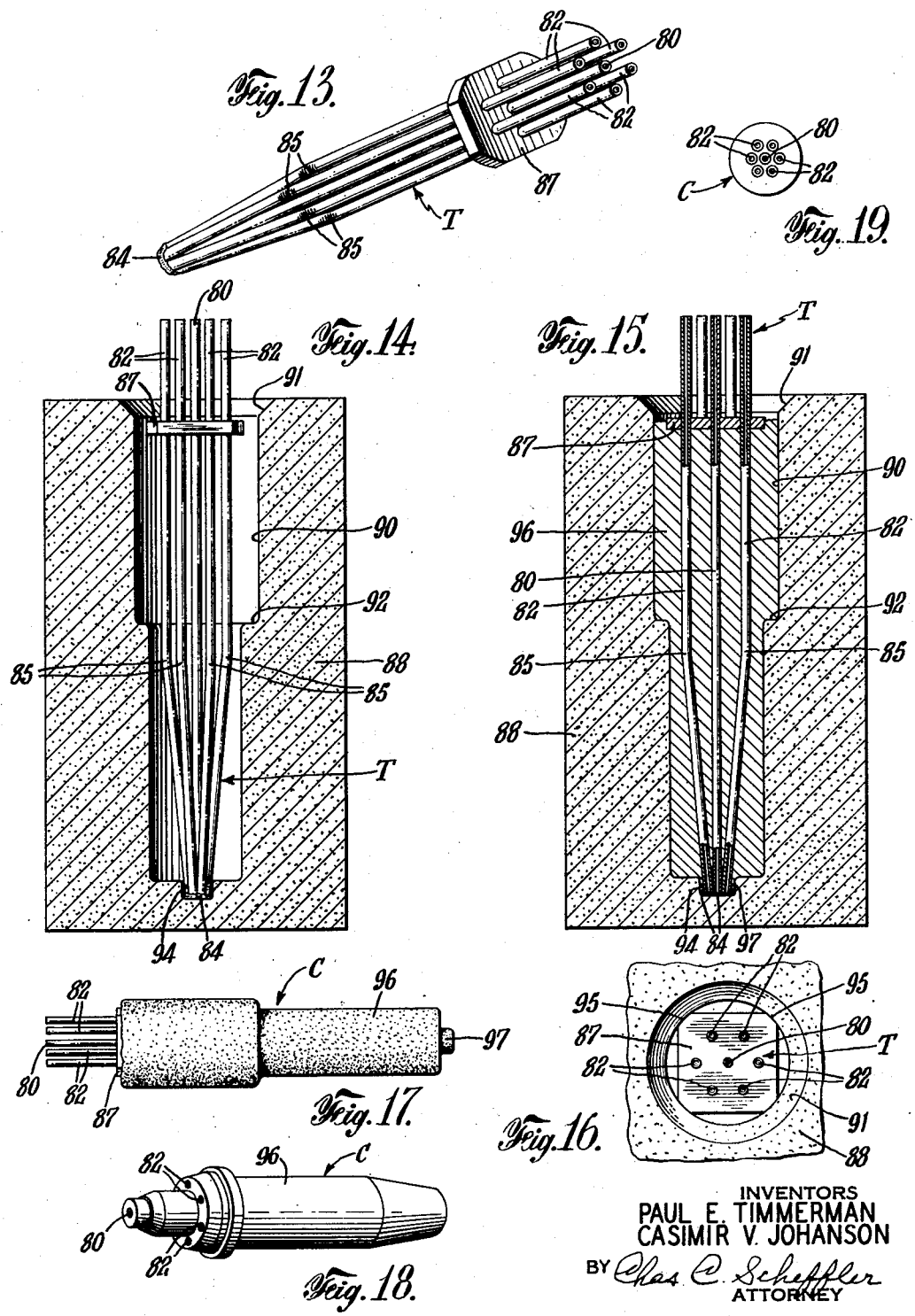

2,378,516

UNITED STATES PATENT OFFICE 2,378,516

MANUFACTURE OF HEATING HEADS AND BLOWPIPE NOZZLES

Paul Edward Timmerman, Elizabeth, and Casimir Valentine Johanson, Cranford, N. J., assignors to The Linde Air Products Company, a corporation of Ohio Application July 2, 1941, Serial No. 400,730

14 Claims. (Cl. 158—27.4)

The present invention relates to blowpipe nozzles and heating heads; and more especially it concerns a novel unitary blowpipe nozzle and/or heating head and method for the production thereof, wherein preformed metal tubes designed to form the gas passages and flame ports are molded or cast in place.

The invention has especial utility for the production of blowpipe nozzles and heating heads requiring a multiplicity of very small, closely spaced gas discharge orifices; and for the production of nozzles having straight passages, or curved passages of simple or compound curvatures, such as are utilized in flame-cutting, gouging, desurfacing, welding, flame hardening and softening, and other heating operations employing oxygen-fuel gas mixtures, with or without one or more oxygen streams.

The methods commonly in use for forming passages in blowpipe nozzle blanks and involving drilling and swaging operations have definite limitations, not only because such procedures are incapable of forming curved passages of complex design in the nozzle body, but also because of the difficulty encountered in drilling tiny passages with the orifices disposed in accurately spaced relation. The tiny drills used frequently break during the drilling operation, leaving portions of the drill embedded in the nozzle blank from which it is practically impossible to remove them without damage to the blank.

In certain instances relatively large passages have been drilled in the nozzle blank, after which inserts of a relatively hard metal adapted to resist wear and abrasion during frequent cleaning are inserted in the large passages and are pressed or silver soldered in place. This procedure has reduced the number of rejected units caused by drill failures.

The casting of metal around tubular members is not now novel per se. However, attempts to utilize such procedures in the manufacture of blowpipe nozzles have not been successful heretofore, due in part to difficulties encountered in producing a casting free from porosity, and one in which the tube is bonded perfectly to the body or casting at all points, as is necessary to insure, during use, prompt conduction of heat away from the passages at and adjacent to the high temperature zone, and to eliminate possibility of gas leakage. The present invention overcomes these difficulties, and provides a homogeneous structure wherein each tube is intimately welded or united by a fusion bond to the cast body, permitting a high degree of heat transfer.

Among the more important objects of this invention are: to provide a novel blowpipe nozzle or heating head of composite unitarily united construction; to provide a blowpipe or heating head having either straight or curved passages therethrough, lined with preformed tubes of suitable metal or alloy; and to provide in novel manner for producing a blowpipe nozzle or heating head having either straight or curved gas passages. These and other objects will be apparent as the following description proceeds.

In the practice of the invention, the tubes to be utilized to define the blowpipe passages are preformed and sized by a suitable extrusion, swaging or equivalent procedure. The tubes may be made of any suitable metal or alloy, for example, copper, stainless steel or bronze. The respective ends of the tubes are then closed and sealed by welding or the like. A plurality of the closed tubes then are secured to each other, preferably by welding the adjacent ends of the tubes in manner to form a tube assembly having the tubes arranged in selected lateral contacting relation or in laterally spaced relation, as desired. The tubes forming the assembly may be straight, or may be curved in any suitable manner. It is preferred to use tubes that are straight or that have a simple curvature, and to group the tubes with laterally spaced portions of each thereof parallel with adjacent portions of the other tubes of the assembly.

This welded assembly of tubes is then cleaned to remove all traces of oxide film, oil, grease, and other foreign matter and, in certain instances, to prepare the tubes for receiving a thin intimately bonded surface coating or film of a metal or alloy that intimately unites with the metal to be cast around the tubes of the assembly. The cleaning step may be effected by dipping the tube assembly in a molten mixture of about four parts of borax and one part of silica, or in another suitable flux. In instances where the tubes are made of stainless steel or other chromium-bearing ferrous or non-ferrous alloys, a fluoride such as an alkali metal fluoride is added to the mixture of borax and silica to assist in removing chromium oxide from the tube surfaces.

The surfacing of the clean tubes with metal preparatory to the casting operation may be effected by dipping the tube assembly in a molten body of the surfacing metal. Thus, stainless steel tubes may be surfaced and "tinned" preparatory to casting the tubes in bronze, by dipping the clean tubes in a molten body of a bronze composed of about 60% copper and 40% zinc.

The assembly of clean tubes, preferably after a "tinning" operation, then is placed in a hot mold of suitable refractory material, with the tubes positioned vertically or at a suitable angle with the horizontal, in order to prevent formation of air bubbles between the tubes during the casting operation. Preferably the mold is preheated prior to the casting step to a temperature at least approximating the melting point of the casting metal to be used.

The molten casting or matrix metal then is poured into the preheated mold containing the tube assembly, while continuing to apply heat to maintain the matrix metal in molten form throughout the casting step. It is of course essential that the metal of the tubes have a higher melting point than the matrix metal. For example, when a bronze matrix is cast around bronze tubes, the melting point of the bronze used in the tubes should be at least 150° F. above that of the bronze matrix alloy.

The mold or tube assembly may be agitated during the casting step to release any gas bubbles or slag trapped at or adjacent the tube surfaces. Such agitation is not essential; and satisfactory cast heating heads free from air bubbles have been secured without such agitation. Pressure may be applied upon the molten metal during the casting operation in suitable manner if desired.

The mold is then permitted to cool, the rate of cooling being controlled as desired to retard or to speed up the same. After the cast metal has solidified, the casting is removed from the mold, and the welded closed ends of the tubes are removed by machining. The casting is then machined to selected size and shape. In instances where the mold surfaces are smooth, as where the molds are produced, or the molding surfaces thereof are treated, in the manner described in United States Patent No. 2,027,932 of Arthur B. Ray, the machining of the cast nozzle is minimized, being limited to the discharge end and to the torch head-seating portion of the nozzle.

The process is particularly serviceable in making blowpipe nozzles that are extremely long, and those requiring a multiplicity of very small closely spaced orifices. In the latter case, as exemplified in the production of scale-removing blowpipe heads, serious difficulty has been encountered in the past in drilling the large number of small closely spaced orifices required. This difficulty is overcome in the practice of this invention by making the body of the heating head and the orifice block or member in separate operations, after which the orifice block is joined to the heating head by a soldering, welding, or equivalent operation.

As more fully described hereinafter, the orifice member may comprise merely a flat plate or the equivalent, having a plurality of closely spaced laterally disposed passages, preferably formed by casting around a series of elongated thin-walled tubes of suitable metal or alloy a body of matrix metal having a suitably high heat conductivity, such as copper, brass, bronze and the like. The tubes generally have internal diameters of less than one-sixteenth of an inch, and may be of capillary size. The thickness and width of the casting may be determined by the size of the slot or other aperture formed in the head to receive the orifice member. The casting may be cut crosswise of the tubes to provide orifice members having the desired depth. The latter then are welded in place in the heating head. By utilizing this process, a large number of orifice members with multiple orifices are securable from a single casting. Any imperfect orifice member may be discarded, without necessitating the loss of an entire heating head of complex design, as has been the case heretofore, due to the common practice of machining such heads before the flame holes are drilled therein.

The invention also is useful in the production of simple blowpipe nozzles; and permits the construction thereof without the need for the many drilling and swaging operations usually required. Thus, a tube providing the cutting gas passages, and the plurality of spaced tubes providing the heating gas passages are secured together in proper spaced relation, and the assembly is processed in the manner hereinbefore described, utilizing a casting step in conjunction with a mold having smooth walls in contact with the cast metal. After removal from the mold, the ends of the tubing and associated parts of the casting are trimmed away; and the casting is machined on the forward or gas delivery end, and is finished on the opposite end to provide the usual seat portion for cooperation with a blowpipe head.

In the accompanying drawings, which illustrate certain modifications of the invention, Fig. 1 is a vertical section through a mold and associated tube assembly;

Fig. 2 is a perspective view, partly in section, of a cast matrix and associated row of metal tubes, following the casting and trimming operations, one section being shown cut away from the cast matrix;

Fig. 3 is a front view of one section of a cast matrix of Fig. 2, parts being broken away;

Fig. 4 is a section taken along the line 4—4 of Fig. 3, looking in the direction of the arrows;

Fig. 5 is a perspective view of a heating head, the orifice member and end members being shown in spaced relation, preparatory to assembly;

Fig. 6 is a perspective view of the assembly heating head of Fig. 5, parts being broken away;

Fig. 7 is a perspective view, partly in section, of a mold and a tube assembly having two rows of associated tubes, parts being broken away;

Fig. 8 is a front view of a cast matrix formed from a plurality of rows of spaced tubes;

Fig. 9 is a front view, similar to Fig. 3, of a fragment of a cast matrix wherein each tube associated therewith is triangular in cross-section;

Fig. 10 is a view similar to Fig. 9, wherein each tube is semi-circular in cross-section;

Fig. 11 is a view of a gouging nozzle, parts being broken away, and parts being shown in section;

Fig. 12 is a view of the discharge end of the nozzle of Fig. 11, parts being omitted;

Fig. 13 is a perspective view of a modified tube assembly and spacer member;

Fig. 14 is a vertical section through a mold and tube assembly, prior to a casting operation;

Fig. 15 is a section similar to Fig. 14, after a casting operation;

Fig. 16 is a top view of the mold and tube assembly of Fig. 15;

Fig. 17 is a side view of the cast nozzle after its withdrawal from the mold;

Fig. 18 is a perspective view of a finished nozzle, following certain machining operations; and Fig. 19 is an end view of the nozzle shown in Fig. 18, parts being omitted.

Referring to Figs. 1 to 4, a plurality of tubes 11—11 of weldable metal or alloy have their respective ends 13 closed by welding or other suitable means. To form an assembly A, the tubes 11 then are assembled in selected relation and interconnected at their ends as by weld metal areas 15, preferably with their side walls 17 in closely spaced parallel relationship. However, the side walls of adjacent tubes may be in contact, particularly where but a single row of tubes is used. The tubes may be curved if desired.

The tubing 11—11 preferably is of very small internal diameter, and has very thin walls. For example, stainless steel tubing having an internal diameter of .020 inch and having a wall thickness of .020 inch has been effectively used; and similar tubing having a wall thickness of around .005 inch still has sufficient strength to resist distortion during the casting step. By the use of this fine tubing, the aligned closely spaced discharge orifices in the heating head provide an elongated flame closely approaching in characteristics a ribbon-type flame such as supplied by a slotted nozzle, the opposite margins of the discharge orifices being no greater than .010 inch apart.

The preformed assembly A of tubing then is carefully cleaned to remove oxide, dirt, oil, grease, and other impurities by dipping the assembly into a bath of molten flux of the type hereinbefore described. Upon withdrawing the assembly A from the flux bath and removing excess flux, the assembly preferably is "tinned" by dipping it in a bath of molten bronze, or by the application of bronze from a welding rod. A bronze composed of 60% copper and 40% zinc has given very satisfactory service in "tinning" stainless steel tubing, adjacent tubes being spaced about .006 inch apart.

The "tinning" operation frequently may be omitted, particularly where the matrix metal to be used is very fluid at the casting temperature, or where the tubes are well spaced apart.

The preformed tubing assembly A then is placed within a preheated mold 20 of suitable refractory material, preferably with the tubing 11 in vertical or nearly vertical position, with the assembly spaced from the side walls of the mold. The matrix metal or alloy, preferably a bronze, is then poured into the mold in the usual manner. The mold may be agitated during or following the pouring operation, though this is not generally necessary.

After pouring the metal is permitted to cool slowly and solidify to form a casting 22. Finally the casting 22 is removed from the mold and machined to size. As shown in Fig. 2, the machining required when using smooth molds is minimized. The casting then is machined to remove the closed ends of tubing 11—11, and is then severed transversely of the longitudinal axes of the tubes into a plurality of short sections 24, each having a series of closely spaced nipples 25 providing parallel or coangular passages through the section, and adapted to serve as an orifice block when assembled with a heating head.

The ends of each nipple 25 in the sections 24 may be reamed to remove foreign particles in the passages caused by the machining operation for cutting the casting 22 into sections. The rear portion of the passage in each nozzle may be tapered by reaming or the equivalent to provide the discharge orifice of the nozzle with a tapered approach passage 27 adapted to increase the gas velocity at that orifice.

As shown in Fig. 5, in the production of one type of flame-hardening and scale-removing heating head having a large number of aligned tiny gas passages very closely grouped together, a blank 30 of suitable metal or alloy such as copper or bronze, is cast, extruded or otherwise formed. A passage 32 and a passage 34 are drilled or otherwise formed longitudinally in the blank 30 and serve, respectively, as a water manifold and as a manifold for an oxy-fuel gas mixture. The passages 32 and 34 may be formed in the blank during a casting operation. A plurality of spaced parallel passages 36 in blank 30 discharge water from manifold 32 in jets upon work disposed adjacent the heating head, for quenching purposes.

A portion of the metal of blank 30 is cut away between passage 34 and the flame face or working surface W by milling or the like, to provide a slot 38 extending longitudinally of passage 34 and communicating with the latter throughout its length. The dimensions of the slot are such that it accommodates accurately one of the aforesaid sections or orifice blocks 24. The latter then is permanently secured in the slot as by silver soldering; and the flame face of the block is cleaned by milling or the like. Two cast ends 40 of the same metal as blank 30 then are silver soldered to the latter, and serve to close the ends of passages 32 and 34. A conduit 42 connects passage 32 with a source of water or other cooling fluid under pressure; and a conduit 44 connects passage 34 with a suitable source of oxy-fuel gas mixture. Fig. 6 shows a completed heating head.

Figs. 7 and 8 illustrate a modification wherein the tubes 11 forming the gas passages and flame ports are preformed, and then are arranged in closely spaced rows and thus maintained during the casting operation. Although but two rows of tubes are shown, it will be understood that any selected number of rows may be employed without departing from the invention. The tubes of adjacent rows thereof may be offset, as shown in Fig. 8, for economy in spacing, and to improve the performance of the resultant heating head during service; but this is not necessary. The cast assembly then is cut into orifice blocks 46 similar to the blocks 24 of Fig. 2.

Figs. 9 and 10 illustrate embodiments of the invention where tubing 50 of triangular cross-section, and tubing 52 of semi-circular cross-section, respectively, are used. Such tubing may be produced in any suitable manner. The tube assemblies and the cast heating head or nozzle are made in the general manner already described in connection with Figs. 1 to 8, and provide orifice blocks especially adapted for use in flame deseaming and desurfacing operations where ridge formation is objectionable.

An important feature of the invention resides in the possibility of producing cast blowpipe nozzles and heating heads having tiny curved passages of any desired curvature. Such passages cannot be produced by any type of drilling or swaging operations.

Figs. 11 and 12 illustrate one form of cast flame gouging nozzle consisting of a cast curvilinear nozzle body 60 surrounding a tube 62 for oxygen, and a plurality of spaced tubes 64 for a heating gas mixture. The tubes 62, 64 preferably are made of copper, stainless steel, bronze, or other suitable metal or alloy, intimately united to said body 60 by a fusion bond. Each of said tubes 62, 64 has a continuous smooth inner surface that is gradually curved, for changing the direction of the respective streams of oxygen and heating gas flowing therethrough. The flame end F of the nozzle has been machined to smooth the same; and the rear or seat end S has been machined in the usual manner to provide a seat portion for attachment to a blowpipe. The curvatures of the tubes 62, 64 may be such that the path of gas discharged from each tube 64 intersects the path of the oxygen from tube 62 at a point a short distance beyond the discharge outlet of the latter.

Figs. 13 to 19 illustrate various stages in the production of a cast cutting nozzle of standard shape. In the production of such a nozzle, according to one procedure, a central tube 80 for oxygen and a plurality of tubes 82 for a heating gas mixture are assembled in lateral closely spaced relation. The respective tubes 80, 82 are sealed at one end 84 by welding, and are welded together at that end, to form a tube assembly with the discharge outlet of the central tube 80 surrounded by the outlets of tubes 82 lying in an annular zone equidistant from the longitudinal axis of tube 80, as shown in Fig. 19. The tube assembly or unit preferably is made of stainless steel or other suitable alloy.

Tubes 82 then are bent, as shown at 85 in Fig. 13, to provide converging gas passages of the general shape of those commonly present in cutting nozzles. To form a tube assembly T, a spacer disc 87, preferably made of steel or other suitable metal or alloy and having spaced apertures accommodating the tubes 80, 82, is then slipped over the free ends of these tubes and positions said free ends in selected spaced relation. The spacer disc 87 is approximately square in shape, as shown in Fig. 16, to permit accurate spacing of the tube assembly within the mold while allowing flow of molten metal past the disc. In the form shown the disc 87 has portions of the edges removed to increase the area of the disc bearing against the mold walls.

The tube assembly or unit T is dipped in a suitable inorganic acid, or a volatile grease solvent or the equivalent for removing grease and dirt, after which it is introduced into a mold or apertured block 88, with or without a welding flux. The mold may be made of graphite or other suitable material; and it has machined therein a cavity 90 corresponding in size and shape to the nozzle to be cast therein. The cavity 90 has a tapered upper marginal portion 91; and has a shoulder 92 formed midway of its length, as shown in Figs. 14 and 15. The cavity has a centrally disposed recess 94 in its base, adapted to house and center the welded closed ends 84 of the tube assembly T. The opposite ends of the tubes 80, 82 are spaced apart and centered in the mold by spacer disc 87 which contacts the interior surface of the mold at spaced areas 95 (see Fig. 16).

Molten matrix metal 96, such as bronze, copper, or other suitable metal or alloy, is then poured into the mold around the tube assembly and past spacer disc 87 until the matrix metal has filled the mold to approximately the entire length of the cavity, as shown in Fig. 15. The metal-filled mold then is heated in a furnace (not shown), thereby maintaining the matrix metal in molten condition for a short time to eliminate any gases. The mold is then cooled, and the cast nozzle C formed therein is withdrawn. Fig. 17 shows the nozzle in the as-cast condition. The nozzle C is then machined to provide the desired external contour, as shown in Fig. 18; to remove the metal flash 97 and the closed ends 84 of the tubes 80, 82; to secure the desired spacing of the gas outlets at the converging ends of tubes 82; and to provide the usual shoulders used for securing the nozzle to a torch head.

One form of cutting nozzle similar to that illustrated in Figs. 13 to 19 and made in the manner described, involved the use of a tube assembly of stainless steel made from tubes approximately 0.06 inch in outside diameter, with passages therein approximating 0.02 inch in diameter. The tubes 82 were so directed that, during use of the nozzle, the preheating flames converged approximately 0.25 inch in front of the nozzle.

It will be apparent that the size of the tubes 80, 82, the spacing of such tubes, and the rate of convergence or divergence of the tubes 82 at the discharge end of the nozzle readily may be varied to suit requirements. It likewise will be understood that other types of molds may be substituted for those shown. Thus, sectional molds may be used; and the internal cavity 90 and the recess 94 may have other shapes than those shown. The recess may be eliminated by welding a disc or other centering member to the ends 84 of the tubes when preparing the tube assembly.

By the practice of the invention it now is possible to produce readily a succession of identical cast blowpipe nozzles or heating heads each having a plurality of closely spaced tiny flame ports and passages preformed and cast in place. It further is possible, by a comparatively simple procedure, to produce orifice members having any desired number of discharge orifices as small as 0.01 inch to 0.02 inch in diameter, and which are so closely adjacent each other as to provide, during use, a flame closely approaching in characteristics a ribbon-type flame such as produced by a slotted orifice, utilizing a nozzle which is not subject to the same distortion during service as the usual slotted nozzle.

The invention is susceptible of modification within the scope of the appended claims.

We claim:

1. A blowpipe head comprising a metal body, a gas manifold associated with said body, and a cast orifice block integrally united with said body, said block having therein a plurality of aligned closely spaced metal gas-conveying tubes which are intimately united by a fusion bond throughout their entire external surfaces with the metal of said block and respectively having continuous inner surfaces and forming passages establishing communication between said gas manifold and the atmosphere surrounding the blowpipe head, each of said metal tubes being non-circular in cross-section and having at least one flat side, said tubes being arranged so that said flat side of each tube lies in a common plane.

2. A blowpipe head as defined in claim 1 wherein each of said tubes is triangular in cross-section.

3. A blowpipe head as defined in claim 1 wherein each of said tubes is semi-circular in cross-section.

4. Process for casting blowpipe nozzles and heating heads which comprises casting matrix metal around an assembly of closely grouped preformed metal tubes having closed ends, while said assembly is disposed within a refractory mold, said matrix metal melting at least below the melting point of the metal of said tubes, cooling and solidifying the metal of the resultant casting, removing the closed ends of said tubes, and shaping the residual casting to form an orifice block having a plurality of outlet passages in laterally closely spaced relation.

5. Process for casting blowpipe nozzles and heating heads, which comprises casting matrix metal around an assembly of closely spaced preformed metal tubes having closed ends and rigidly secured together, while said assembly is immersed in a body of molten matrix metal melting at least 150° F. below the melting point of the metal of said tubes, cooling and solidifying the metal of the resultant casting, removing the closed ends of said tubes, and machining the residual casting to form at least one orifice block having at least one row of outlet passages in closely spaced relation.

6. Process for casting blowpipe nozzles and heating heads, which comprises casting matrix metal around an assembly of closely spaced preformed metal tubes having clean, metallurgically bright, outer surfaces and having closed ends, and rigidly secured together, while said assembly is immersed in a body of molten matrix metal melting at least 150° F. below the melting point of the metal of said tubes, cooling and solidifying the metal of the resultant casting, removing the closed ends of said tubes, and machining the residual casting to form at least one orifice block having at least one row of tiny outlet passages in closely spaced relation, each of said passages having a tapered portion.

7. Process for making cast blowpipe nozzles and heating heads, which comprises forming an assembly of laterally disposed, closely spaced preformed metal tubes arranged in at least one row, corresponding parts of each of said tubes being parallel, each of the tubes being rigidly connected to the others forming the assembly and having at least one end thereof permanently sealed, casting matrix metal around the tube assembly, cooling and solidifying the metal of the resultant casting, severing the closed ends of the tubes of said assembly, and reshaping the residual casting to form at least one orifice block having at least one row of tiny outlet passages extending therethrough in closely spaced relation.

8. Process for making cast blowpipe nozzles and heating heads, which comprises forming an assembly of laterally disposed, closely spaced preformed metal tubes arranged in at least one row, corresponding parts of each of said tubes being parallel, each of the tubes being rigidly connected to the others forming the assembly and having at least one end thereof permanently sealed, removing oxide impurities from the outer surfaces of said tubes, casting matrix metal around the tube assembly, cooling and solidifying the metal of the resultant casting, severing the closed ends of the tubes of said assembly, and reshaping the residual casting to form at least one orifice block having at least one row of tiny outlet passages extending therethrough in closely spaced relation.

9. Process for making cast blowpipe nozzles and heating heads, which comprises forming an assembly of laterally disposed, closely spaced preformed metal tubes arranged in at least one row, corresponding parts of each of said tubes being parallel, each of the tubes being rigidly connected to the others forming the assembly and having at least one end thereof permanently sealed, removing oxide impurities from the outer surfaces of said tubes, coating the cleaned surfaces of the tubes with a thin surface film of a metal readily alloying with the metal of the tubes and with the casting metal, casting matrix metal around the tube assembly, cooling and solidifying the metal of the resultant casting, severing the closed ends of the tubes of said assembly, and reshaping the residual casting to form at least one orifice block having at least one row of tiny outlet passages extending therethrough in closely spaced relation.

10. Process for producing heating heads suitable for flame-cutting, machining, welding and heat-treating operations and having tubes defining passages therein cast in place, which process comprises assembling a plurality of tiny metal tubes of capillary size in lateral closely spaced relation, said tubes being rigidly secured together as a unit and with the ends of said tubes permanently closed, casting a matrix of molten metal around said tube assembly while maintaining the metal of said tubes above its softening temperature, removing from the resultant casting the closed ends of each of said tubes, and reshaping the residual casting to provide an orifice member having at least one row of tiny outlet passages of capillary size in closely spaced relation, and providing each of said passages with a tapered portion.

11. Process for casting a blowpipe nozzle, which comprises assembling a plurality of closely spaced preformed tubes of small internal diameter with an end of each converging toward a corresponding end of each of the others, the converging ends of said tubes being closed; securing said converging ends together with the respective passages therein in lateral closely spaced relation; securing said tube assembly as a unit within a heat-refractory mold; casting molten matrix metal around said tube assembly while in said mold, said matrix metal melting at a lower temperature than the metal of said tube assembly; cooling and solidifying the metal of the resultant casting; removing the closed ends of said tubes; and shaping the outer surfaces of the residual casting to form a blowpipe nozzle.

12. Process of making a blowpipe head with a gas manifold and an orifice block, which comprises forming an orifice block by casting metal about a plurality of aligned closely spaced metal tubes; shaping the residual casting to form an orifice block with a plurality of spaced outlet passages therethrough; and finally uniting said orifice block with a metal body having a gas manifold associated therewith, said tubes forming passages establishing communication between said gas manifold and the atmosphere surrounding the blowpipe head.

13. A process of forming a blowpipe head which comprises forming a manifold body with an opening to receive an orifice block, casting metal around an assembly of closely grouped preformed metal tubes while the assembly is disposed in a mold, cooling and solidifying the metal of the resultant casting, shaping the resultant casting to fit the opening in the manifold, and finally securing the orifice block in place within the manifold opening.

14. A blowpipe head for producing a substantially sheet-like stream of gas said head comprising a metal body, a gas supply manifold associated with said body, and a plurality of non-circular metal gas conveying tubes within said body, said tubes having smooth inner surfaces and forming passages establishing communication between said gas manifold and the surrounding atmosphere, said tubes each having at least one flat side and being closely spaced to form a row of discharge orifices with said flat sides of the tubes substantially aligned in a common plane, said tubes being secured permanently and gastightly in said body by an intimate fusion bond union between the external surfaces of said tubes and the metal of said body to confine the flow of gas from said manifold solely through said tubes and provide unimpeded heat conduction between said body and said tubes.

PAUL EDWARD TIMMERMAN.
CASIMIR VALENTINE JOHANSON.